United States Patent
Chiao et al.

(10) Patent No.: US 6,478,741 B2
(45) Date of Patent: Nov. 12, 2002

(54) TRANSMISSION OF OPTIMIZED PULSE WAVEFORMS FOR ULTRASONIC SUBHARMONIC IMAGING

(75) Inventors: Richard Yung Chiao, Clifton Park, NY (US); Anne Lindsay Hall, New Berlin, WI (US)

(73) Assignee: General Electric Company, Niskayuna, NY (US)

( * ) Notice: Subject to any disclaimer, the term of this patent is extended or adjusted under 35 U.S.C. 154(b) by 15 days.

(21) Appl. No.: 09/810,048

(22) Filed: Mar. 19, 2001

(65) Prior Publication Data

US 2002/0133074 A1 Sep. 19, 2002

(51) Int. Cl.[7] .................................................. A61B 8/00
(52) U.S. Cl. ....................................................... 600/447
(58) Field of Search ................................ 600/443, 442, 600/447, 440, 448, 441, 450–456; 73/625, 626; 367/7, 11

(56) References Cited

U.S. PATENT DOCUMENTS

| | | | |
|---|---|---|---|
| 5,833,614 A | | 11/1998 | Dodd et al. ................. 600/447 |
| 6,095,977 A | * | 8/2000 | Hall et al. ................... 600/443 |
| 6,113,544 A | * | 9/2000 | Mo ............................. 600/443 |
| 6,155,980 A | * | 12/2000 | Chiao et al. ................ 600/447 |
| 6,282,963 B1 | * | 9/2001 | Haider ........................ 600/447 |
| 6,312,386 B1 | * | 11/2001 | Bolorforosh et al. ....... 600/447 |

OTHER PUBLICATIONS de Jong et al., "Characteristics of Contrast Agents and 2D Imaging," 1996 IEEE Ultrasonics Symposium, pp. 1449–1458, 1997.
de Jong et al., "Principles and Recent Developments in Ultrasound Contrast Agents," Ultrasonics, vol. 29, 1991, pp. 324–330.
Shi et al., "Subharmonic Imaging with Microbubble Contrast Agents," Ultrasonic Imaging, vol. 21, No. 2, pp. 79–94, 1999.

* cited by examiner

*Primary Examiner*—Marvin M. Lateef
*Assistant Examiner*—Ali M. Imam
(74) *Attorney, Agent, or Firm*—Jill M. Breedlove; Christian G. Cabou

(57) ABSTRACT

An optimized pulse waveform is used to excite contrast microbubbles such that the subharmonic signal may be easily isolated for imaging. By reducing the contribution of transmitted fundamental frequency $f_0$ within the subharmonic band, the subharmonic imaging quality is improved. This is accomplished by transmitting an optimized pulse waveform and then filtering the received signal to isolate the subharmonic signal for imaging. The optimized pulse waveform has low spectral energy within a band of frequencies centered at $f_0/2$ and high spectral energy within another band of frequencies centered at $f_0$, where both bands are within the transducer passband. The contrast-generated subharmonic signal is extracted by a receive filter centered at $f_0/2$.

24 Claims, 4 Drawing Sheets

TRANSMISSION OF OPTIMIZED PULSE WAVEFORMS FOR ULTRASONIC SUBHARMONIC IMAGING

BACKGROUND OF THE INVENTION

This invention relates to ultrasound imaging systems and, more particularly, to increasing the (sub)harmonic-to-fundamental ratio and the (sub)harmonic-to-noise ratio of contrast agent-generated (sub)harmonic signals in medical ultrasound imaging.

Conventional ultrasound imaging systems comprise an array of ultrasonic transducer elements which are used to transmit an ultrasound beam and receive the reflected beam from the object being studied. Such scanning comprises a series of measurements in which the focused ultrasonic wave is transmitted, the system switches to receive mode after a short time interval, and the reflected ultrasonic wave is received, beamformed and processed for display. Typically, transmission and reception are focused in the same direction during each measurement to acquire data from a series of points along an acoustic beam or scan line. The receiver is dynamically focused at a succession of ranges along the scan line as the reflected ultrasonic waves are received.

One type of conventional system includes a transmit beamformer that supplies high-voltage transmit waveforms in a plurality of channels via transmit/receive switches to a transducer array. The transmit beamformer and the transducer array have a broadband response and are capable of transmitting the maximum allowable acoustic power densities for better signal-to-noise sensitivity. The transducer array generates an ultrasonic transmit beam in response to the transmit waveforms, and this transmit beam propagates outwardly through the subject being imaged. The transducer frequency response acts as a bandpass filter. Ultrasonic energy echoed by the subject is received by the transducer array and focused by a receive beamformer. The transducer and receive beamformer have a broadband response. The focused signal is then filtered to attenuate undesired frequencies.

For ultrasound imaging, the array comprises a multiplicity of transducer elements arranged in one or more rows and driven with separate voltages. By selecting the time delay (or phase) and amplitude of the applied voltages, the individual transducer elements in a given row can be controlled to produce ultrasonic waves which combine to form a net ultrasonic wave that travels along a preferred vector direction and is focused at a selected point along the beam. The beamforming parameters of each of the firings may be varied to provide a change in maximum focus or otherwise change the content of the received data for each firing, e.g., by transmitting successive beams along the same scan line with the focal point of each beam being shifted relative to the focal point of the previous beam. For a steered array, by changing the time delays and amplitudes of the applied voltages, the beam with its focal point can be moved in a plane to scan the object. For a linear array, a focused beam directed normal to the array is scanned across the object by translating the aperture across the array from one firing to the next.

The same principles apply when the transducer probe is employed to receive the reflected sound in a receive mode. The voltages produced at the receiving transducer elements are summed so that the net signal is indicative of the ultrasound reflected from a single focal point in the object under study. As with the transmission mode, this focused reception of the ultrasonic energy is achieved by imparting a separate time delay (and/or phase shift) and gain to the signal from each receiving transducer element.

An ultrasound image is composed of multiple image scan lines. A single scan line (or small localized group of scan lines) is acquired by transmitting focused ultrasound energy at a point in the region of interest, and receiving the reflected energy over time. The focused transmit energy is referred to as a transmit beam. During the time after transmit, one or more receive beamformers coherently sum the energy received by each channel, with dynamically changing phase rotation or time delays, to produce peak sensitivity along the desired scan lines at ranges proportional to the elapsed time. The resulting focused sensitivity pattern is referred to as a receive beam. Resolution of a scan line is a result of directivity of the associated transmit and receive beam pair.

The output signals of the beamformer channels are coherently summed to form a respective pixel intensity value for each sample volume in the object region or volume of interest. These pixel intensity values are log-compressed, scan-converted and then displayed as an image of the anatomy being scanned.

Conventional ultrasound transducers transmit a broadband signal centered at a fundamental frequency $f_0$, which is applied separately to each transducer element making up the transmit aperture by a respective pulser. The pulsers are activated with time delays that produce the desired focusing of the transmit beam at a particular transmit focal position. As the transmit beam propagates through tissue, echoes are created when the ultrasound wave is scattered or reflected off of the boundaries between regions of different density. The transducer array is used to transduce these ultrasound echoes into electrical signals, which are processed to produce an image of the tissue. These ultrasound images are formed from a combination of fundamental (linear) and harmonic (nonlinear) signal components, the latter of which are generated in nonlinear media such as tissue or a blood stream containing contrast agents. With scattering of linear signals, the received signal is a time-shifted, amplitude-scaled version of the transmitted signal. This is not true for acoustic media which scatter nonlinear ultrasound waves.

The echoes from a high-level signal transmission will contain both linear and nonlinear signal components. In certain instances ultrasound images may be improved by suppressing the fundamental and emphasizing the harmonic (nonlinear) signal components. If the transmitted center frequency is $f_0$, then tissue/ contrast nonlinearities will generate harmonics at $kf_0$ and subharmonics at $f_0/k$, where k is an integer greater than or equal to 2. [The term "(sub)harmonic", as used herein, means harmonic and/or subharmonic signal components.] Imaging of harmonic signals has been performed by transmitting a narrow-band signal at frequency $f_0$ and receiving at a band centered at frequency $2f_0$ (second harmonic) followed by receive signal processing.

The technique of harmonic imaging using contrast agents is known. For example, harmonic imaging using contrast agents is disclosed by de Jong et al. in "Principles and Recent Developments in Ultrasound Contrast Agents," Ultrasonics, Vol. 29, pp. 324–330 (1991). Contrast agent-generated harmonic imaging is capable of greatly improving image quality in vascular studies.

Contrast agents are typically encapsulated gas microbubbles between 0.1 and 10 microns in diameter. When introduced into the body by injection, contrast agents serve as high-reflectivity markers for blood flow and perfusion. Ultrasonic signals reflected from contrast microbubbles contain subharmonic components centered at half the transmit (fundamental) frequency as well as harmonic components centered at multiples of the transmit frequency. Isolating the (sub) harmonic signals for imaging is attractive because the contrast-to-tissue ratio is much higher for (sub) harmonic signals than for the fundamental signal.

A basic problem with (sub) harmonic imaging is how to separate the (sub) harmonic signal from the fundamental since the fundamental is usually much stronger than the (sub) harmonic signal. A pulse waveform for second harmonic imaging was described in U.S. Pat. No. 5,833,614. However, there is a need for pulse waveforms which have been optimized for subharmonic imaging.

BRIEF SUMMARY OF THE INVENTION

In a preferred embodiment of the invention, a family of transmit sequences when converted into pulse waveforms, excite contrast agent microbubbles injected into the anatomy such that the ultrasonic subharmonic signal may be easily isolated for imaging. Transmit sequences that produce pulse waveforms having very low spectral energy at the subharmonic frequencies permit the subharmonic signal generated by the contrast agents to be extracted simply by filtering. Subharmonic imaging is thus improved by reducing the contribution of transmitted fundamental signals within the subharmonic band. This reduction is accomplished by transmitting a pulse derived from a transmit sequence belonging to a particular family of transmit sequences, and filtering the received signal to isolate the subharmonic signal for imaging. The resulting transmitted waveforms have low spectral energy within a band of frequencies centered at $f_0/2$ and high spectral energy within another band of frequencies centered at $f_0$, where both bands are within the transducer passband. The transmitted signal at frequency $f_0$ is the fundamental frequency such that the contrastgenerated subharmonic signal may be extracted by a receive filter centered at frequency $f_0$.

In accordance with a preferred embodiment, the pulse waveforms are bipolar (consisting of pulses of opposite phase corresponding to +1 and −1 code elements of a transmit code sequence) and are constructed as follows: (1) start with L unipolar impulses, (2) repeat the L impulses M times, alternating the sign each time, and (3) repeat the entire sequence N times, where both M and N are greater than 1, and M is odd. The number L is inversely proportional to the transmit frequency.

DETAILED DESCRIPTION OF THE INVENTION

Figure 1:
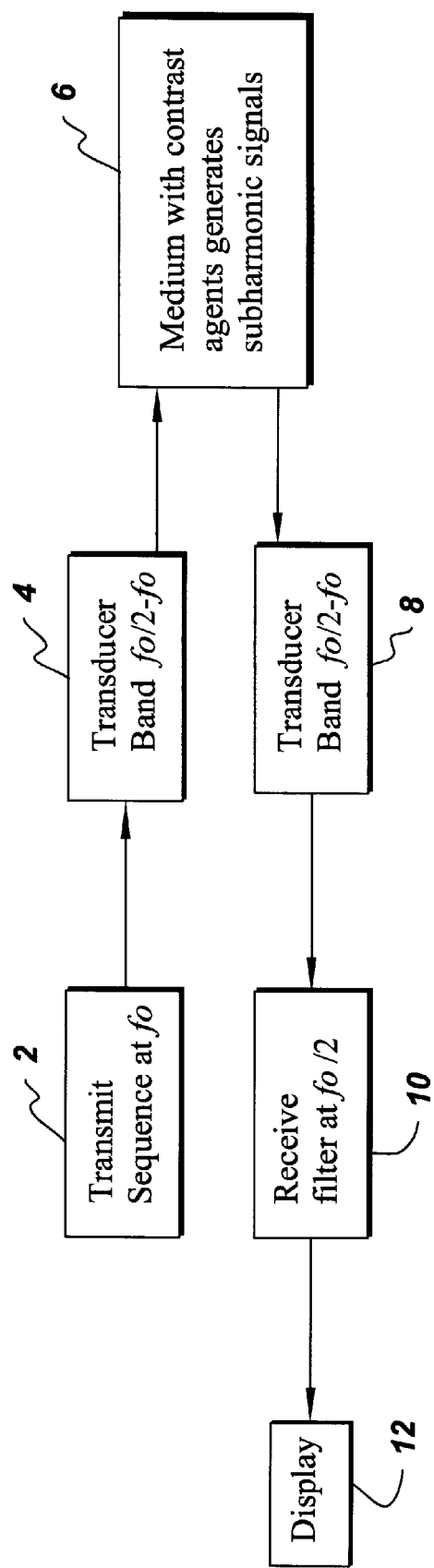
FIG. 1 is a block diagram the basic concept common to the preferred embodiments of the present invention.

FIG. 1 illustrates practice of the method in accordance with a preferred embodiment of the invention as comprising the steps of: generating a transmit sequence centered at a transmit frequency $f_0$ (step 2); activating an ultrasonic transducer array having a bandwidth covering at least the frequency range from $f_0/2$ to $f_0$ in order to transmit an ultrasonic pulse waveform based on the generated transmit sequence (step 4); directing the transmitted ultrasonic pulse waveform into a medium having contrast agents which generate subharmonic signals (step 6); transducing the contrast-agent-generated fundamental and subharmonic signals (within the bandwidth of the transducer) into electrical signals at the transducer array (step 8); filtering the received electrical signals supplied by the transducer array to pass only a band of frequencies centered at the subharmonic frequency $f_0/2$ (step 10); and processing the filtered electrical signals to form an imaging signal for display (step 12). These steps are intended to improve subharmonic imaging by reducing the contribution of the transmitted fundamental signals in the resulting receive band. The transmit waveform is optimized to have low spectral energy within the band of frequencies centered at $f_0/2$ and high spectral energy within the band of frequencies centered at $f_0$.

Figure 2:
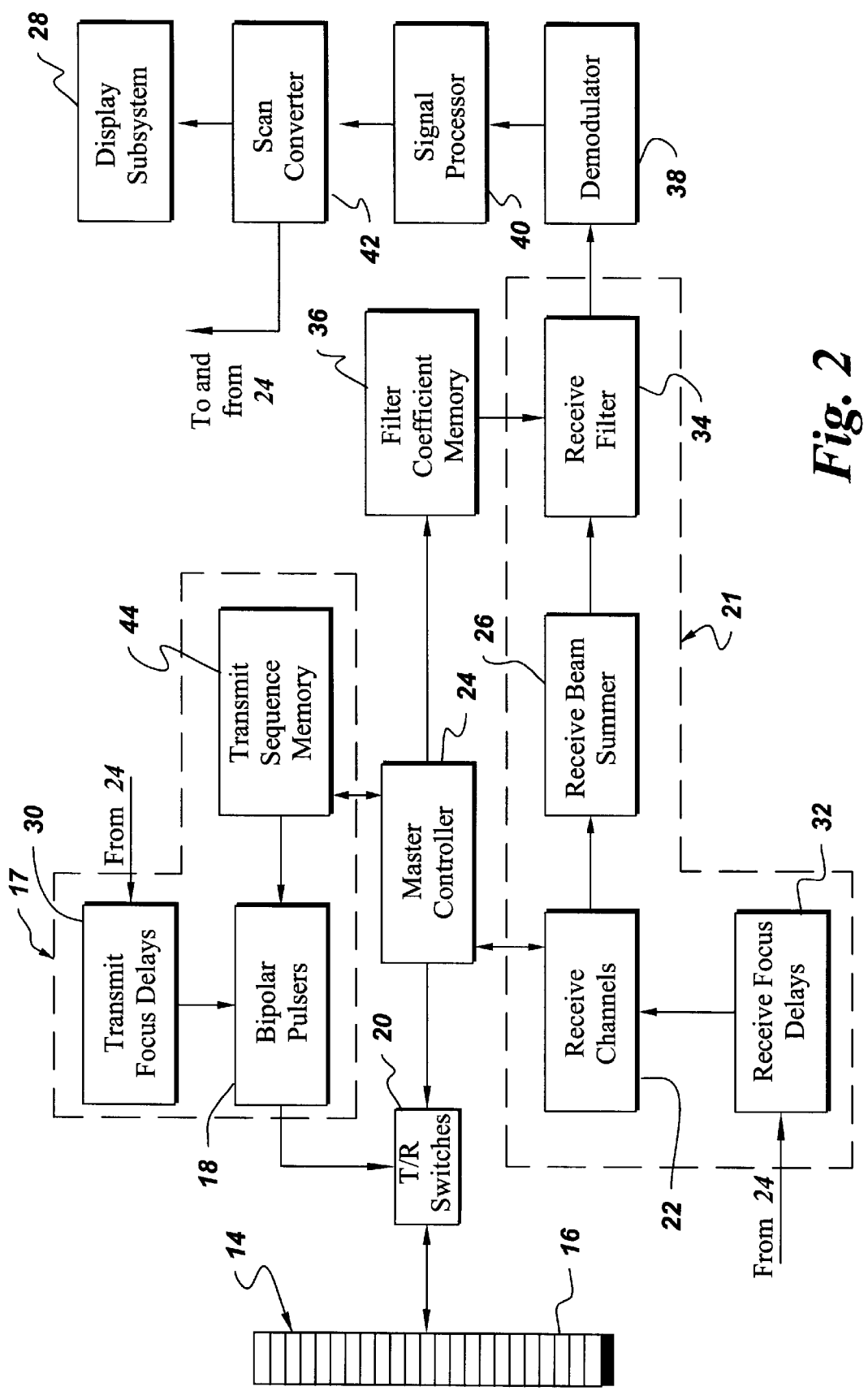
FIG. 2 is a block diagram of a conventional ultrasound imaging system that can be programmed to operate in accordance with the preferred embodiments of the invention.

The general configuration of an ultrasound imaging system of a type which can be programmed to perform the above-described method is shown in FIG. 2. The system comprises a transducer array 14 including a plurality of separately driven transducer elements 16, each of which produces a burst of ultrasonic energy when energized through a respective transmit/receive (T/R) switch 20 by a pulsed waveform produced by a respective bipolar pulser 18 of a transmitter 17. The transducer elements of array 14 typically comprise piezoelectric transducers. The ultrasonic energy reflected back to transducer array 14 from the object under study is converted to an electrical signal by each receiving transducer element 16 and applied separately to a respective receive channel 22 of a receiver 21 through a respective T/R switch 20. The T/R switches 20 are typically diodes which protect the receive electronics from the high voltages generated by the transmit electronics. The transmit signal causes the diodes to shut off or limit the signal to the receiver. Transmitter 17 and receiver 21 are operated under control of a master controller (or host computer) 24 responsive to commands provided by a human operator via an operator interface (not shown). A complete scan is performed by acquiring a series of echoes in which transmitter 14 is gated ON momentarily to energize each transducer element 16, and the subsequent echo signals produced by each transducer element 16 are applied to a respective receive channel 22. A channel may begin reception while another channel is still transmitting. A receive beamsummer 26 combines the separate echo signals from each receive channel 22 into a single echo signal which is used to produce a line in an image on a display monitor of a display subsystem 28.

Under the direction of master controller 24, transmitter 17 drives transducer array 14 such that the ultrasonic energy is transmitted as a directed focused beam. To accomplish this, respective time delays are imparted to a multiplicity of bipolar pulsers 18 from a lookup table 30 for example. Master controller 24 determines the conditions under which the acoustic pulses will be transmitted, including the timing and amplitudes of the transmit pulses to be generated by pulsers 18. The amplitudes of each transmit pulse are generated by an apodization generation circuit (not shown). Pulsers 18 in turn send the transmit pulses to each of elements 16 of the transducer array 14 via T/R switches 20. By appropriately adjusting the transmit focus time delays 30 and the apodization weightings (not shown) in a conventional manner, an ultrasonic beam can be directed and focused to form a transmit beam.

The echo signals produced by each burst of ultrasonic energy reflect from objects located at successive ranges along each transmit beam. The echo signals are sensed separately by each transducer element 16, and a sample of the echo signal magnitude at a particular point in time represents the amount of reflection occurring at a specific range. Due to the differences in the propagation paths between a reflecting point and each transducer element 16, the echo signals are not detected simultaneously and their amplitudes are not equal. Receiver 21 amplifies the separate echo signals via a respective TGC (time-gain control) amplifier (not shown) in each receive channel 22. TGC is carried out by increasing or decreasing gain as a function of depth. The amount of amplification provided by the TGC amplifiers is controlled by a TGC circuit (not shown), which is set by the host computer and hand operation of potentiometers (not shown). Receive channels 22 impart the proper time delays received from a beamformer memory 32 and receive apodization weightings (not shown) for each amplified echo signal. Beamsummer 26 sums the receive channel output signals to provide an echo signal that accurately indicates the total ultrasonic energy reflected from a point located at a particular range along one ultrasonic beam. The receive focus time delays from memory 32 are computed in real-time using specialized hardware or are read from a lookup table.

The beamsummed signal is bandpass filtered by a receive filter 34, which passes only a band of frequencies centered at a frequency of interest. Filter 34 receives filter coefficients from a memory 36, which is preferably loaded by master controller 24. Alternatively or in addition, bandpass filtering can be performed in the separate receive channels prior to beamsumming.

In the system shown in FIG. 2, the output signal frequency of the receive filter is shifted to baseband by a demodulator 38. One way of achieving this is to multiply the demodulator input signal by a complex sinusoidal $e^{i2\pi f_d t}$, where $f_d$ is the frequency shift required to bring the signal spectrum to baseband. The demodulated signals are then supplied to a signal processor 40, which converts them to display data. In the B-mode (gray-scale), the display would be based on the envelope of the signal with some additional processing, such as edge enhancement and logarithmic compression.

In general, the display data are converted by a scan converter 42 into X–Y format for video display. The scan-converted frames are passed to a video processor (not shown) incorporated in display subsystem 28. The video processor maps the video data for display and sends the mapped image frames to the display subsystem.

The images displayed by the video monitor (not shown) of display subsystem 28 are produced from an image frame of data in which each datum indicates the intensity or brightness of a respective pixel in the display. An image frame may, e.g., comprise a 400×500 data array in which each intensity datum is an 8-bit binary number that indicates pixel brightness. The brightness of each pixel on the display monitor is continuously refreshed by reading the value of its corresponding element in the data array in a well-known manner. Each pixel has an intensity value which is a function of the backscatter cross section of a respective sample volume in response to interrogating ultrasonic pulses.

In accordance with a preferred embodiment of the invention, each transducer element in the transmit aperture is pulsed using a bipolar pulse waveform derived from a transmit sequence output from the transmit sequence memory 44. The transmit sequence consists of a sequence of +1 and −1 code elements. During a transmit firing, each bipolar pulser 18 preferably receives identical transmit sequences. The +1 and −1 code elements of each transmit sequence are transformed into pulses of opposite phase by pulsers 18. The bipolar pulse waveform is constructed as follows: (1) start with L unipolar impulses, (2) repeat the L impulses M times, alternating the sign each time, and (3) repeat the entire sequence N times, where both the variables M and N are each greater than 1, and M is odd. The variable L is inversely proportional to the transmit frequency. This family of pulse waveforms has high energy in the fundamental spectrum centered at frequency $f_0$ and significantly lower energy in the subharmonic spectrum centered at frequency $f_0/2$. As should be apparent, the above-described pulse waveform can be produced using a transmit sequence constructed as follows: (1) start with a string of L+1 code elements; (2) repeat the L+1 code elements M times, changing the +1 code elements to −1 in every other string; and (3) repeat the entire sequence of M strings N times. The resulting transmit sequence is preferably loaded into a transmit sequence memory 44 by master controller 24 (see FIG. 2).

Pulsers 18 drive the elements 16 of transducer array 14 such that the ultrasonic energy produced is focused in a beam for each transmit firing. To accomplish this, transmit focus time delays 30 are imparted to the respective pulsed waveforms produced by the pulsers. The pulsed waveforms are derived from the transmit sequences. By appropriately adjusting the transmit focus time delays in a conventional manner, the ultrasonic beams can be focused at a multiplicity of transmit focal positions to effect a scan in an image plane.

For each transmit, the echo signals from transducer elements 16 are fed to respective receive channels 22 of the receiver 21. Each one of receive channels 22 includes a TGC amplifier and an analog-to-digital converter (not shown in FIG. 2). Under the direction of master controller 24, the receiver tracks the direction of the transmitted beam. Receive beamformer memory 32 imparts the proper receive focus time delays to the received echo signals and sums them to provide an echo signal that accurately indicates the total ultrasonic energy reflected from a particular receive depth. The time-delayed receive signals are summed in receive beamsummer 26 for each transmit firing.

The beamsummed receive signals acquired following each transmit firing are supplied to receive filter 34, which is designed or programmed to pass only a band of frequencies centered at the subharmonic frequency of interest, e.g., at $f_0/2$, to isolate the subharmonic signal. Receive filter 34 preferably comprises a finite impulse response (FIR) filter having filter coefficients designed to bandpass filter the beamsummed signal. Suitable filter coefficients are stored in memory 36 and are provided to receive filter 34 at the appropriate times.

Figure 3:
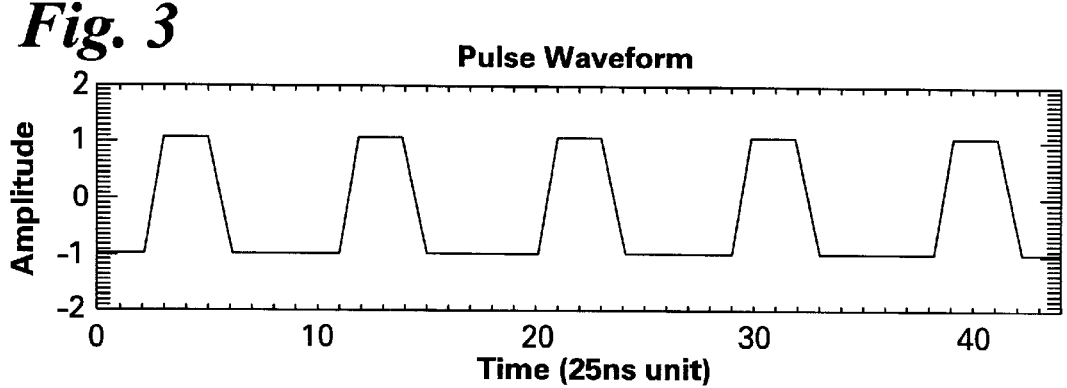
FIG. 3 is a diagram depicting a pulse waveform in accordance with one preferred embodiment of the invention.
Figure 4:
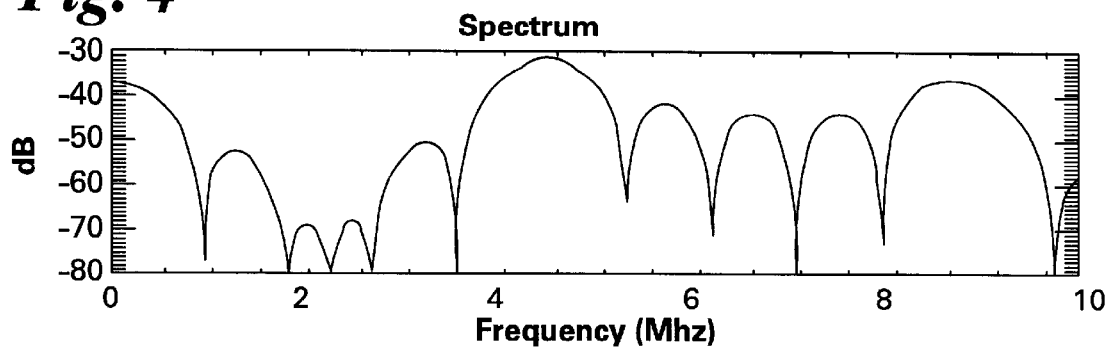
FIG. 4 is a graph of the spectrum resulting from employment of the pulse waveform depicted in FIG. 3.

One example of a transmit sequence which belongs to the aforementioned family of transmit sequences can be generated by setting the variables L, M and N as follows: L=3, M=3 and N=5. Applying the algorithm set forth above, the result is a transmit sequence consisting of {−1, −1, −1, 1, 1, 1, −1, −1, −1} repeated 5 times. The complete pulse waveform and its spectrum are shown in FIGS. 3 and 4 respectively for a 25 nsec (nanosecond) sampling interval. As can be seen, the transmit spectrum is centered at $f_0$=4.5 MHz (megahertz) with minimal transmit energy in a band centered at $f_0/2$=2.25 MHz.

Figure 5:
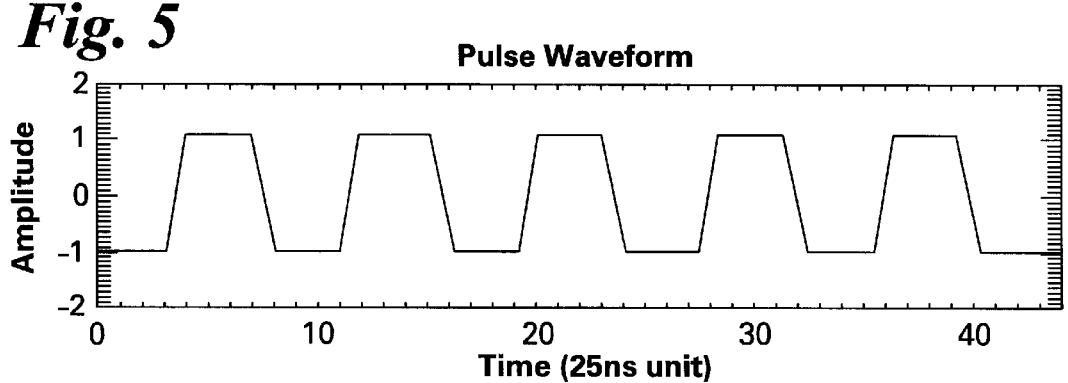
FIG. 5 is a diagram depicting a tone burst in accordance with one conventional transmit scheme.
Figure 6:
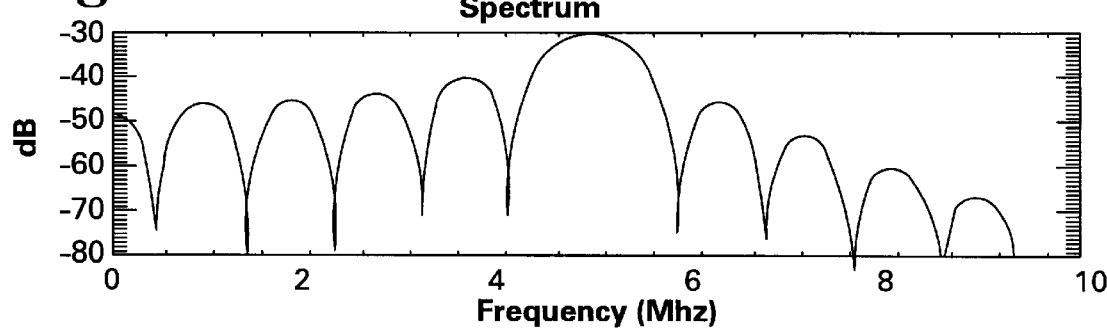
FIG. 6 is a graph of the spectrum resulting from employment of the tone burst depicted in FIG. 5.

The pulse waveform shown in FIG. 3 may be compared with a "conventional" pulse waveform shown in FIG. 5, which is a tone burst with 5.5 cycles (approximately the same total transmit length as for the pulse waveform shown in FIG. 3). As seen in FIG. 6, the tone burst shown in FIG. 5 has significantly higher transmit energy at the subharmonic frequencies.

Figure 7:
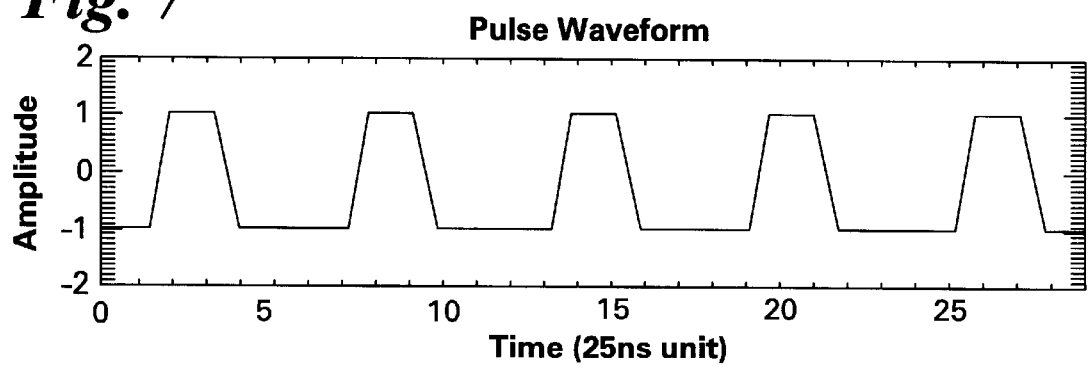
FIG. 7 is a diagram depicting a pulse waveform in accordance with another preferred embodiment of the invention.
Figure 8:
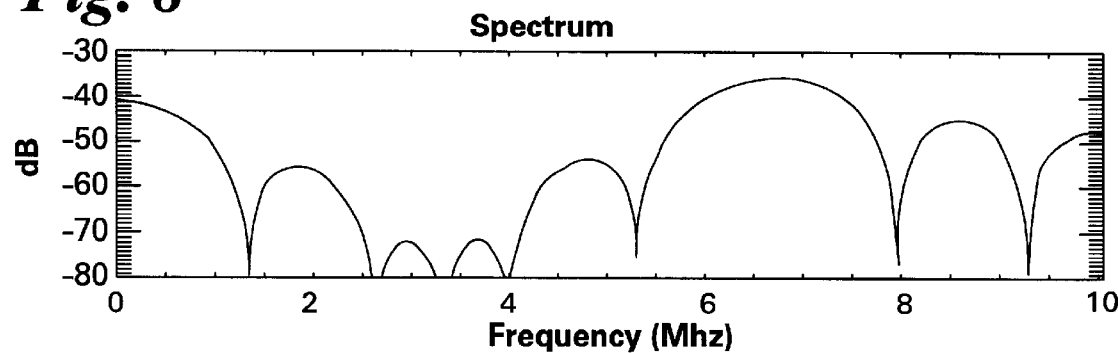
FIG. 8 is a graph of the spectrum resulting from employment of the pulse waveform depicted in FIG. 7.

Another example of the invention can be seen when L=2, M=3 and N=5, which results in the transmit sequence consisting of {−1, −1, 1, 1, −1, −1} repeated 5 times. The complete pulse waveform and its spectrum are shown in FIGS. 7 and 8 assuming a 25 nsec sampling interval. As can be seen in FIG. 8, the transmit spectrum is centered at $f_0$=6.75 MHz with minimal transmit energy in a band centered at $f_0/2$=3.375 MHz.

Figure 9:
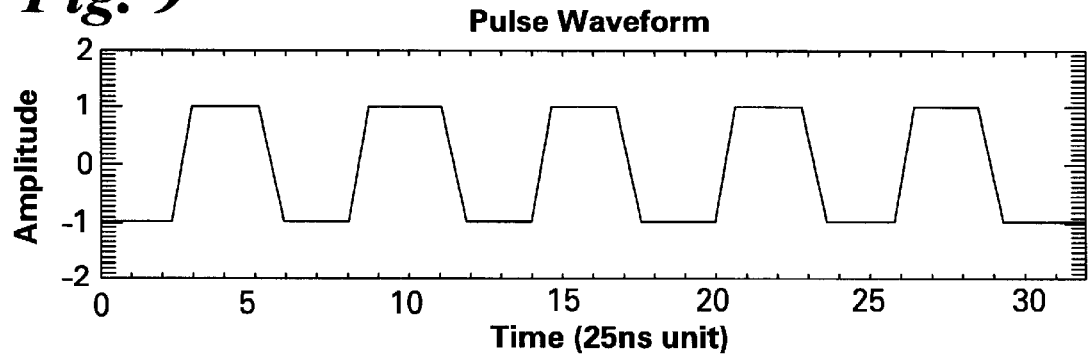
FIG. 9 is a diagram depicting a tone burst in accordance with another conventional transmit scheme.
Figure 10:
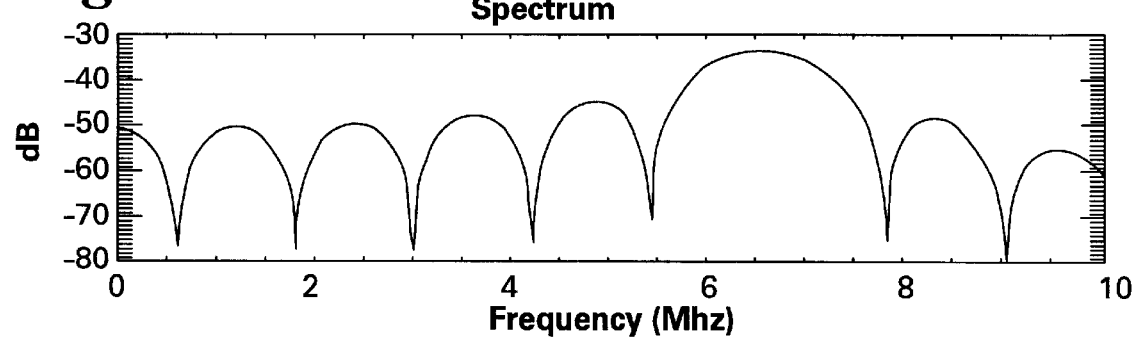
FIG. 10 is a graph of the spectrum resulting from employment of the tone burst depicted in FIG. 9.

The pulse waveform shown in FIG. 7 may be compared with a "conventional" pulse waveform shown in FIG. 9, which is a tone burst with 5.5 cycles (approximately the same total transmit length as for the pulse waveform shown in FIG. 7). As seen in FIG. 10, the tone burst shown in FIG. 9 has significantly higher transmit energy at the subharmonic frequencies.

The pulse waveforms in accordance with the preferred embodiments thus allow the subharmonic signal to be easily isolated for imaging by filtering While only certain preferred features of the invention have been illustrated and described, many modifications and changes will occur to those skilled in the art. It is, therefore, to be understood that the appended claims are intended to cover all such modifications and changes as fall within the true spirit of the invention.

What is claimed is:

1. A system for transmitting a beam of wave energy, comprising:
   a transducer array including a multiplicity of transducer elements; and
   a transmit beamformer programmed to activate each of said transducer elements with respective transmit focus delays during a transmit firing to produce a bipolar pulse sequence consisting of N sequences of impulses, each of said N sequences in turn consisting of M strings of impulses, each odd-numbered string of said M strings consisting of L impulses having one polarity, and each even-numbered string of said M strings consisting of L impulses having another polarity opposite to said one polarity, wherein M and N are each greater than 1, and M is odd.

2. The system as recited in claim 1, wherein each of said transducer elements comprises a piezoelectric transducer.

3. The system as recited in claim 1, wherein L=3, M=3 and N=5.

4. The system as recited in claim 1, wherein L=2, M=3 and N=5.

5. A method for operating an array of transducer elements to transmit a beam of wave energy, comprising the steps of driving transducer elements of said array with bipolar pulses during a transmit firing so as to form a transmit aperture, said bipolar pulses consisting of N sequences of impulses, each of said N sequences in turn consisting of M strings of impulses, each odd-numbered string of said M strings consisting of L impulses having one polarity, and each even-numbered string of said M strings consisting of L impulses having another polarity opposite to said one polarity, wherein M and N are each greater than 1, and M is odd.

6. The method as recited in claim 5, wherein L=3, M=3 and N=5.

7. The method as recited in claim 5, wherein L=2, M=3 and N=5.

8. A system for transmitting a beam of wave energy, comprising:
   a transducer array comprising a multiplicity of transducer elements;
   a multiplicity of pulsers coupled to respective transducer elements of said transducer array; and
   a transmit beamformer programmed to activate each of said pulsers with respective transmit focus delays and with a transmit sequence during a transmit firing, said transmit sequence consisting of N sequences of code elements having equal magnitudes and opposite signs, each of said N sequences consisting of M strings of code elements, each odd-numbered string of said M strings consisting of L code elements having one sign, and each even-numbered string of said M strings consisting of L code elements having another sign opposite to said one sign, wherein M and N are each greater than 1, and M is odd.

9. The system as recited in claim 8, wherein each of said transducer elements comprises a piezoelectric transducer element.

10. The system as recited in claim 8, wherein L=3, M=3 and N=5.

11. The system as recited in claim 8, wherein L=2, M=3 and N=5.

12. The system as recited in claim 8, wherein said transmit beamformer comprises a transmit sequence memory programmed with said transmit sequence and having outputs coupled to said pulsers.

13. An imaging system comprising:
   a transducer array comprising a multiplicity of transducer elements for transmitting wave energy in response to electrical activation and transducing returned wave energy into electrical signals;
   a transmitter coupled to said transducer array and programmed to activate selected transducer elements to form a transmit aperture for transmitting focused wave energy in the form of a bipolar pulse sequence waveform having a fundamental frequency $f_0$ during a transmit firing, said bipolar pulse sequence consisting of N sequences of impulses, each of said N sequences consisting of M strings of impulses, each odd-numbered string of said M strings consisting of L impulses having one polarity, and each even-numbered string of said M strings consisting L impulses having another polarity opposite to said one polarity, wherein M and N are each greater than 1, and M is odd;
   a receiver programmed to form a receive signal from electrical signals supplied from selected transducer elements forming a receive aperture subsequent to said transmit firing, said reciever including a filter programmed to extract from said receive signal a subharmonic signal component centered at a frequency $f_0/2$; and a subsystem for displaying an image having an image portion which is a function of said subharmonic signal component.

14. The system as recited in claim 13, wherein said subsystem comprises:
   a processing subsystem programmed to form an image signal from said subharmonic signal component; and
   a display subsystem programmed to display an image having an image portion which is a function of said image signal.

15. The system as recited in claim 13, wherein said multiplicity of transducer elements comprise piezoelectric elements for transmitting ultrasound waves in response to electrical activation and transducing returned ultrasound waves into electrical signals.

16. The system as recited in claim 13, wherein L=3, M=3 and N=5.

17. The system as recited in claim 13, wherein L=2, M=3 and N=5.

18. An imaging system comprising:
   a transducer array comprising a multiplicity of transducer elements for transmitting wave energy in response to electrical activation and transducing returned wave energy into electrical signals;
   means for activating selected transducer elements to form a transmit aperture for transmitting focused wave energy in the form of a bipolar pulse sequence waveform having a fundamental frequency $f_0$ during a transmit firing, said bipolar pulse sequence consisting of N sequences of impulses, each of said N sequences in turn consisting of M strings of impulses, each odd-numbered string of said M strings consisting of L impulses having one polarity, and each even-numbered string of said M strings consisting of L impulses having another polarity opposite to said one polarity, wherein M and N are each greater than 1, and M is odd;
   means for forming a receive signal from electrical signals supplied from selected transducer elements forming a receive aperture subsequent to said transmit firing, said means including a filter programmed to extract from said receive signal a subharmonic signal component centered at a frequency $f_0/2$; and
   means for displaying an image having an image portion which is a function of said subharmonic signal component.

19. An imaging system comprising:
   a transducer array comprising a multiplicity of transducer elements for transmitting wave energy in response to electrical activation and transducing returned wave energy into electrical signals;
   a display monitor for displaying an image having an image portion which is a function of an image signal; and
   signal processing means programmed to perform the steps of:
   (a) activating selected transducer elements forming a transmit aperture for transmitting focused wave energy in the form of a bipolar pulse sequence waveform having a fundamental frequency $f_0$ during a transmit firing, said bipolar pulse sequence consisting of N sequences of impulses, each of said N sequences consisting of M strings of impulses, each odd-numbered string of said M strings consisting of L impulses having one polarity, and each even-numbered string of said M strings consisting of L impulses having another polarity opposite to said one polarity, wherein M and N are each greater than 1, and M is odd;
   (b) forming a receive signal from electrical signals supplied from selected transducer elements forming a receive aperture subsequent to said transmit firing;
   (c) extracting from said receive signal a subharmonic signal component centered at a frequency $f_0/2$;
   (d) forming an image signal from said subharmonic signal component; and
   (e) sending said image signal to said display monitor.

20. The system as recited in claim 19, wherein L=3, M=3 and N=5.

21. The system as recited in claim 19, wherein L=2, M=3 and N=5.

22. A method of operating an imaging system including a multiplicity of transducer elements for transmitting wave energy in response to electrical activation and transducing returned wave energy into electrical signals, and a display monitor for displaying an image having an image portion which is a function of an image signal, said method comprising the steps of:
   (a) activating selected transducer elements to form a transmit aperture for transmitting focused wave energy in the form of a bipolar pulse sequence waveform having a fundamental frequency $f_0$ during a transmit firing, said bipolar pulse sequence consisting of N sequences of impulses, each of said N sequences consisting of M strings of impulses, each odd-numbered string of said M strings consisting of L impulses having one polarity, and each even-numbered string of said M strings consisting of L impulses having another polarity opposite to said one polarity, wherein M and N are each greater than 1, and M is odd;
   (b) forming a receive signal from electrical signals supplied from selected transducer elements forming a receive aperture subsequent to said transmit firing;
   (c) extracting from said receive signal a subharmonic signal component centered at a frequency $f_0/2$;
   (d) forming an image signal from said subharmonic signal component; and
   (e) sending said image signal to said display monitor.

23. The method as recited in claim 22, wherein L=3, M=3 and N=5.

24. The method as recited in claim 22, wherein L=2, M=3 and N=5.

* * * * *